Patented May 4, 1937

2,078,958

UNITED STATES PATENT OFFICE 2,078,958

GAS TURBINE SYSTEM

Alf Lysholm, Stockholm, Sweden, assignor to Aktiebolaget Milo, Stockholm, Sweden, a corporation of Sweden Continuation of application Serial No. 522,923, March 16, 1931. This application November 23, 1935, Serial No. 51,230. In Germany March 24, 1930

15 Claims. (Cl. 60—42)

The present application is a continuing application with respect to and replaces my copending application Serial No. 522,923, filed March 16, 1931, and with respect to common subject matter herein continued relates back to the subject matter of said application Serial No. 522,923 for all dates and rights incident to the filing of said application Serial No. 522,923 and applications in foreign countries corresponding thereto.

The present invention relates to gas turbine apparatus and has particular reference to gas turbine systems or power plants of the type in which a gaseous motive fluid produced by the combustion of fuel and a compressed combustion supporting medium such as air is employed to drive a plurality of turbines independently of each other with respect to speed of operation, one or more of which turbines drive apparatus for the production of net useful power and other or others of which turbines drive one or more compressors for compressing the combustion supporting constituent of the motive fluid.

Still more particularly the invention relates to gas turbine systems of the continuous combustion type, as distinguished from systems of the type in which gaseous motive fluid is produced by intermittent explosions. Continuous combustion systems are also referred to as constant pressure systems, although the pressure at which motive fluid is produced in such systems drops at part load operation.

With systems of the character under discussion, the utility and commercial practicability of the plants depends upon the amount of power that can be produced for useful work, over and above the power required to operate the compressor part of the plant, and the efficiency with which the net useful power can be produced.

A general object of the present invention is to provide new and improved gas turbine apparatus capable of producing net useful power efficiently at the load for which the apparatus or plant is primarily designed and also capable of producing net useful power with comparatively small loss in efficiency at loads materially different from the load at which the plant operates at maximum efficiency. A further general object of the invention is to provide a plant of the character under discussion capable of operating with substantially uniform efficiency at different loads, in which complicated control mechanism is not required and in which automatic distribution of the power to the several turbines of the plant, substantially in accordance with the requirements of the several turbines at different loads, takes place over wide variations in the value of the load on the system in response solely to control of the fuel supply without the necessity for providing additional controls for either the compressed combustion supporting constituent of the motive fluid or of the motive fluid supplied to the turbines. A still further object is to provide a plant having the above stated characteristics and which may readily be operated at different values of load while maintaining constant or substantially constant speed of operation of the useful power turbine or turbines.

The above objects of the invention and other and more detailed objects thereof are obtained by utilizing one or more turbines for driving the apparatus for producing net useful power, which turbines may conveniently be termed power output turbines, by utilizing one or more turbines for driving the compressor parts of the plant, which turbines may conveniently be termed compressor turbines, and by connecting these turbines with respect to the flow of motive fluid therethrough in the manner to be hereinafter more fully described so that motive fluid flows from its source to final exhaust pressure without losses incident to throttling control and with the turbine driving the compressor of lowest pressure exhausting against a pressure as low or lower than the pressure against which any other turbine in the plant exhausts.

The invention is applicable to many different specific forms and arrangements of turbine apparatus and for purposes of illustration there are shown in the accompanying drawings forming a part of this specification, three different embodiments of apparatus illustrative of variations in arrangement which may be employed within the scope of the invention. The embodiments shown are, however, to be understood as illustrative only and not in any sense limiting, the scope of the invention being defined in the appended claims.

Figure 1:
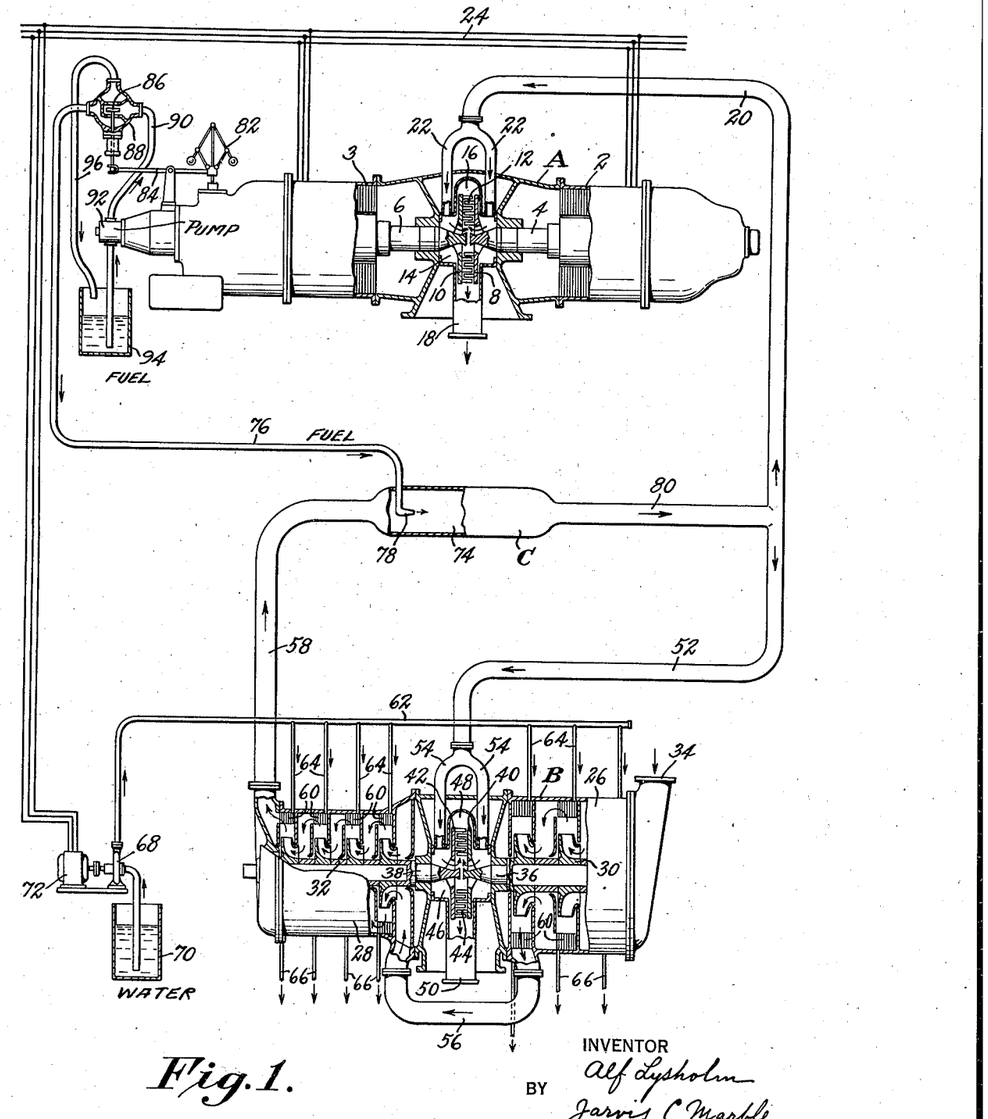
Fig. 1 is a more or less diagrammatic view, partly in elevation and partly in section, of a gas turbine power plant embodying the invention.

Turning now to Fig. 1, the apparatus illustrated comprises a power output section, indicated generally at A, for the production of net useful power, and a compressor section indicated generally at B. The power output section A in the embodiment illustrated consists of a turbogenerator. Apparatus other than an electrical generator may be employed for delivering net useful power. The turbo-generator comprises two generator parts 2 and 3 comprising rotors mounted respectively on shafts 4 and 6. Shafts 4 and 6 are rotatably mounted in axial alignment and have adjacent overhung ends upon which are mounted respectively rotors 8 and 10. Rotors 8 and 10 each carry a plurality of rings of turbine blades indicated generally at 12 and providing a path for radial flow of motive fluid from the central admission chamber 14 of the turbine to the exhaust chamber 16 from which motive fluid is exhausted to atmosphere through the exhaust conduit 18. The turbine just described is of the double rotation radial flow type and employs reaction blading with central full admission of motive fluid to the turbine blading. The invention is not restricted to this specific type of turbine but for reasons which will hereinafter be made apparent, it is important in order to secure the maximum benefits from the present invention to employ turbine structure utilizing full admission of motive fluid to the turbine blading so that regulation of the plant in response to wide variations in the value of the load may be effected without introducing losses occasioned by throttling the flow of motive fluid.

Motive fluid for operating the power output turbine is supplied to chamber 14 through conduit 20 having branch pipes 22 leading to chamber 14. Power from the generator parts 2 and 3 is taken off through the wiring system indicated generally at 24 and in accordance with usual practice the generator parts 2 and 4 are preferably electrically connected so that the rotors are synchronized as to speed, the turbine rotors 8 and 10 revolving in opposite directions at the same absolute speeds.

The compressor part B of the apparatus comprises in the present embodiment a turbo-compressor having a low pressure compressor section 26 and a high pressure compressor section 28, each of these sections having a multiple-stage rotor, designated respectively at 30 and 32, for multistage centrifugal compression of air admitted through the inlet 34 of the low pressure compressor. Rotors 30 and 32 are mounted on axially aligned shafts 36 and 38 respectively, the adjacent overhung ends of which carry respectively the turbine rotors 40 and 42. Rotors 40 and 42 each carry a plurality of rings of turbine blades 44 providing a path for radial flow of motive fluid from the central admission chamber 46 of the turbine to the exhaust chamber 48 from which motive fluid is exhausted to atmosphere through the exhaust conduit 50. The turbine of the compressor part is, like the power output turbine of the double rotation radial flow type, and, like the power output turbine, need not be of this specific type. However, for securing maximum benefit from the invention, the compressor turbine should be of a type employing full admission of motive fluid. Motive fluid is supplied to the compressor turbine through the conduit 52 and branches 54 which lead to the admission chamber 46.

The outlet of the low pressure compressor section 26 is connected by means of the conduit 56 to the inlet of the high pressure section 28 and the outlet of the latter compressor section communicates with the delivery conduit 58.

In the embodiment illustrated, interstage cooling of the compressed air is employed in order to reduce the amount of work required to effect compression. This has certain advantages in some types of plants but is not essential to the exercise of the present invention. For effecting such interstage cooling a plurality of stage coolers diagrammatically indicated at 60 are employed, these coolers being supplied with a suitable cooling fluid such as water through the supply conduit 62 and branch pipes 64. Cooling water is discharged through pipes 66. Water for cooling purposes is supplied by pump 68 drawing water from a suitable source 70 and conveniently operated by motor 72.

Delivery conduit 58 is connected to the inlet of a heating device C having a combustion chamber 74 to which fuel is admitted through pipe 76 and nozzle 78. The outlet of the heating device C is connected by means of the conduit 80 to the conduits 20 and 52 leading respectively to the power output and compressor turbines.

The amount of fuel supplied to the combustion chamber 74 is controlled by means of suitable governing apparatus, which may be of any of the usual types for maintaining constant or substantially constant speed of operation of a turbine. The details of construction of such apparatus form per se no part of the present invention and for simplicity I have indicated the apparatus diagrammatically as comprising a fly-ball governor 82 connected by a link 84 to the valve member 86 of the control valve 88.

Fuel is supplied to valve 88 through pipe 90 from pump 92 which may be conveniently driven from the shaft 6. Pump 92 is supplied with fuel from a suitable reservoir 94 and the pipe 96 leading from the control valve serves to return excess fuel from the control valve to the reservoir. Obviously, other specific forms of apparatus for supplying and controlling the quantity of fuel supplied may be employed.

The operation of the plant is as follows:

Air is drawn into the low pressure compressor section 26 and is compressed first in this section and then in the high pressure section 28 to the pressure at which the plant is designed to operate and is delivered at this pressure to the combustion chamber 74. Fuel, mixed with the air in chamber 74, is burned continuously in this chamber to produce a heated and compressed gaseous motive fluid which is delivered through conduit 80 and conduits 20 and 52 to the power output turbine and the compressor turbine respectively. In its flow from the inlet of the low pressure compressor section to the outlets 18 and 50 of the turbines, it will be observed that the gaseous medium, both in the form of air prior to combustion with the fuel and in the form of the gaseous motive fluid supplied to the turbines, flows through open unregulated conduits. This open and unthrottled flow of the gaseous medium through the apparatus eliminates not only the cost and complication of regulating apparatus for the gaseous medium but also eliminates all losses due to throttling which must occur in apparatus where control valves for the gaseous medium are required in order to secure proper operation of the apparatus when load on the plant changes. Also, it will be observed that the power output turbine and the compressor turbine are connected in parallel with respect to flow of motive fluid from the combustion chamber and that both of these turbines exhaust against the same low back pressure, which in the present instance is atmospheric pressure. As will hereinafter more fully appear, it is not essential to the present invention that the power output turbine exhaust against the lowest back pressure of any turbine in the plant, but it is essential to the invention that the turbine driving the lowest pressure compressor section exhaust against as low a back pressure as that against which any other turbine in the plant exhausts. In other words, the turbine driving the lowest pressure compressor section is not employed as an intermediate pressure or high pressure turbine exhausting motive fluid to another turbine of the plant for further expansion.

When the load on the plant changes, control of the operation of the plant in order to meet the change in load requirement is effected by altering the amount of fuel supplied to the combustion chamber. If, for example, the load on the plant drops, the power output turbine will tend to increase its speed and the governor will act on the control valve 88 to decrease the supply of fuel to the combustion chamber. This decrease in the rate at which fuel is supplied will result in a momentary decrease in the temperature of the motive fluid with consequent decrease in its heat content available for conversion into energy in the turbines. This initial decrease in temperature of the motive fluid is caused because of the fact that decrease in the rate of fuel supply occurs substantially immediately in response to the decrease in load and before there is any change in the rate of operation of the compressor part of the plant. The decrease in temperature of the motive fluid with consequent decrease in energy of the motive fluid results in a decrease in the output of the turbines, and due to the fact that the power output and compressor turbines are connected in parallel with respect to the flow of the motive fluid, there is substantially immediate and proportionate reduction in the power developed by the turbines in the two parts of the plant. Thus, it will be seen that the speed of operation of the low pressure compressor section will be substantially immediately affected upon decrease in load so as to cause this compressor section to compress air at a lower rate. As a result, the rate and pressure at which air is supplied to the combustion chamber by the compressor part of the plant is diminished and this reduction in the rate at which air is supplied enables the combustion of the reduced quantity of fuel to again produce motive fluid at a temperature for which the plant is designed to operate. Thus, upon decrease in load the plant will operate with motive fluid at an initial temperature within the range suitable for operation of the plant but with motive fluid supplied at a rate and at an initial pressure lower than those for normal load conditions.

Upon increase in load the reverse of the above described action will take place, the immediate reaction to the increase in load being a momentary increase in initial temperature of the motive fluid due to increase in the rate of fuel supply, which increase in temperature will be reduced as soon as the compressor turbine responds to the increased heat content of the motive fluid and causes the compressor part to supply air at higher pressure and in greater quantity to the combustion chamber.

Thermo-dynamic calculations, which it is not believed necessary to incorporate in this specification in order for the invention to be understood, show that with an arrangement such as that under discussion automatic balance between the amount of compressor work done and the useful work done takes place under different load conditions without the necessity for any throttling control of the flow of motive fluid of the several turbines or of the air during its flow through the compressor part of the apparatus to the combustion chamber. Because of this automatic balance of the distribution of the work done by the turbines when arranged in accordance with the invention, variations in load on the plant from full load down to values as low as half load or lower can be satisfactorily compensated for by fuel control only and it can therefore be said that for normal operation of the plant continuous unthrottled flow of the compressed air and of the motive fluid takes place.

Figure 2:
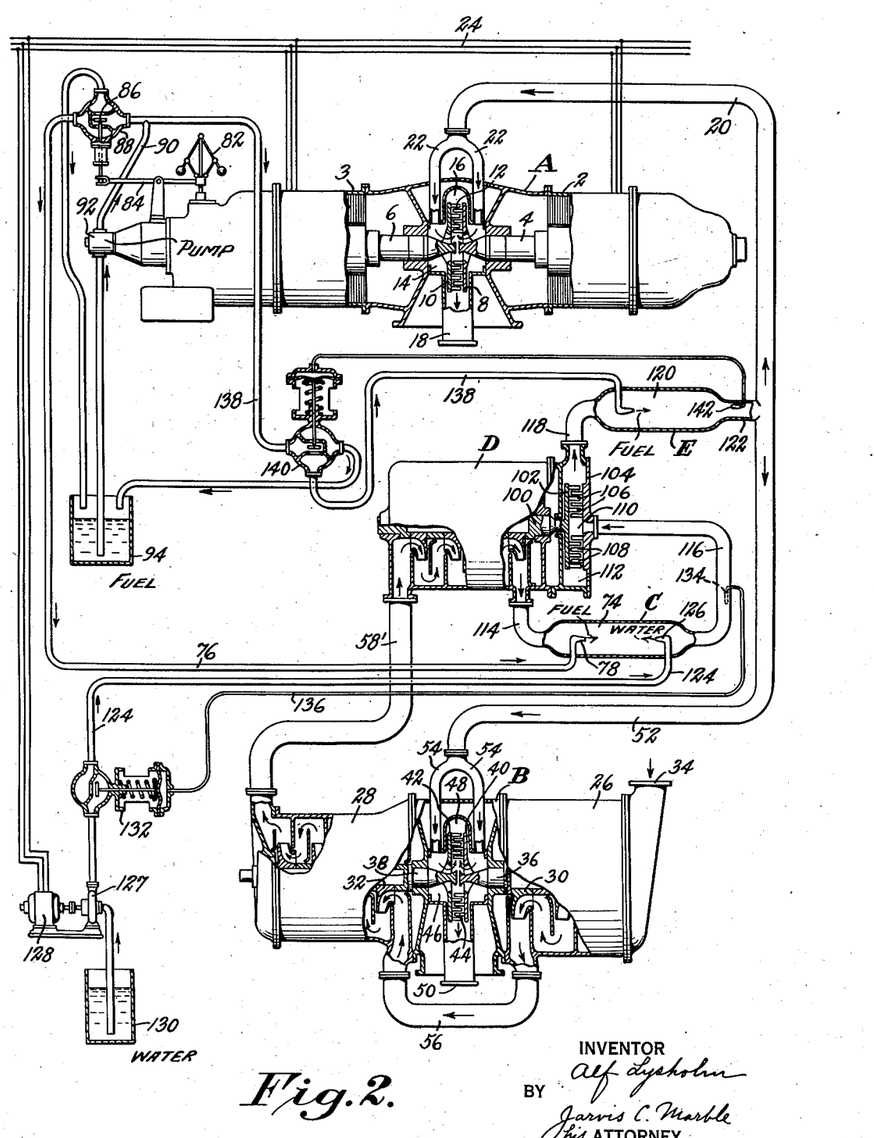
Fig. 2 is a view similar to Fig. 1 showing a plant embodying the invention and adapted to operate at somewhat higher pressure than the plant shown in Fig. 1.

In Fig. 2 a plant arrangement is shown for a plant adapted to operate at higher initial pressure than the plant shown in Fig. 1 and also adapted to employ water injection and reheating of the motive fluid between expansion stages.

Turning now more particularly to this figure, the power output part comprises a turbo-generator A, the construction of which is the same as that originally described in connection with Fig. 1 and having parts designated by similar reference characters.

The compressor part of the plant comprises three compressor sections, the low pressure and intermediate pressure sections of which are similar in construction and arrangement to the two compressor sections shown in Fig. 1 and the parts of which are designated by corresponding reference numerals.

In the present instance a diabatic compression is employed in the compression sections, the air not being cooled between compression stages. The third or high pressure compression section, designated generally at D, comprises a centrifugal multiple-stage compressor having a rotor mounted on shaft 100, the extended overhung end of which carries the turbine rotor 102 disposed in the turbine casing 104 and having a plurality of rings of turbine blades 106. A plurality of rings of stationary turbine blades 108 are fixed in the casing 104 and blades 106 and 108 provide a path for radial flow of motive fluid from the central admission chamber 110 to the exhaust chamber 112 of the turbine.

The above described turbine is a radial flow turbine of the single rotation type and within the scope of the present invention the turbine may be of a type other than that illustrated. It will be observed, however, that this turbine is of the full admission type like the double rotation turbines and in order to secure the maximum benefit from the invention, this turbine, like the others, should be of the type employing full admission of motive fluid and provided with reaction blading.

The outlet of the compressor section 28 is connected by means of pipe 58' to the inlet of the high pressure compressor section and the outlet of this section is connected by means of conduit 114 to the inlet of the combustion chamber 74 in the heating device C. The outlet of combustion chamber 74 is connected by means of conduit 116 with the admission chamber 110 of the turbine of the high pressure turbo-compressor part D. The outlet of the turbine of this part is connected by means of conduit 118 with a reheating device E having a combustion chamber 120 and the outlet of combustion chamber 120 is connected by means of conduit 122 with conduits 20 and 52 leading respectively to the turbines of the turbo-generator A and the turbo-compressor B.

Fuel is supplied to the combustion chamber 74 of the heating device C through pipe 76 and nozzle 78 from pump 92 in the manner previously described in connection with Fig. 1. Control of the amount of fuel supplied is effected through the medium of a control valve 88 actuated by the governor 82 in the manner already described.

In addition to the fuel supplied to the heating device C, water is also injected to the combustion chamber 74 through pipe 124 and nozzles 126. For supplying water the pump 127 driven by motor 128 may be conveniently employed, the pump drawing water from a suitable source indicated at 130 and delivering to pipe 124 through the control valve 132. The amount of water supplied through pipe 124 is controlled by valve 132 in accordance with temperature variations in pipe 116 in which there is located a thermostat 134 connected to the valve by means of a suitable operating connection 136.

Fuel is supplied to the combustion chamber 120 of the reheating device E through pipe 138 connected to the discharge pipe 90 leading from the fuel pump 92 and having interposed therein the control valve 140 movable in response to impulses from the thermostat 142 in conduit 122 to control the rate at which fuel is supplied to the reheating combustion chamber.

In this arrangement the operation of the plant is in general the same as that of the plant shown in Fig. 1 but because of the use of three compressor sections the initial pressure of the motive fluid flowing to the heating device C is substantially higher than in the plant where but two compressor sections are employed. Also, by utilizing the reheating device E to elevate the temperature of the motive fluid as exhausted from the turbo-compressor D, higher thermal efficiency of the plant is obtained. Combustion in the reheating device E is obtained without supply of additional air to this device because of regulation of the amount of fuel supplied to the heating device C so that the motive fluid leaving the heating device contains a substantial quantity of excess air which provides the necessary oxygen for supporting combustion in the reheating device. The use of water injection is to enable excessive combustion temperatures to be avoided and is of particular utility for plants subjected to overloads, since by the injection of water the resulting generation of steam enables an additional volume of motive fluid to be made available without increasing the total amount of compressor work to an extent proportional to the increase in volume. Such additional motive fluid is obtained, however, at some sacrifice in thermal efficiency of the plant since the introduction of steam as a constituent of the motive fluid introduces a loss corresponding in amount to the latent heat of vaporization of the steam. Reheating of the motive fluid and also water injection are not essential to the exercise of the present invention but serve to illustrate the different kinds of plants to which the invention is applicable.

The motive fluid produced in the heating chamber C flows first through the turbine of the turbo-compressor D, the arrangement being such that the high pressure compressor section is driven by the high pressure turbine of the plant. Motive fluid exhausted from the high pressure turbine and reheated in the reheating device E then flows in parallel to the low pressure turbines of the turbo-generator A and the turbo-compressor B, the latter including the low pressure compressor section.

It will be seen that in the present plant arrangement the distribution of the motive fluid with respect to the range of expansion of motive fluid in the turbine driving the low pressure compressor is the same as in the plant shown in Fig. 1, and when the load on the plant varies, automatic distribution of motive fluid to the several turbines is obtained in a manner securing substantially the proper amount of power from the several turbines to meet the requirements at different loads without the necessity for throttling either the turbines or the compressors.

Figure 3:
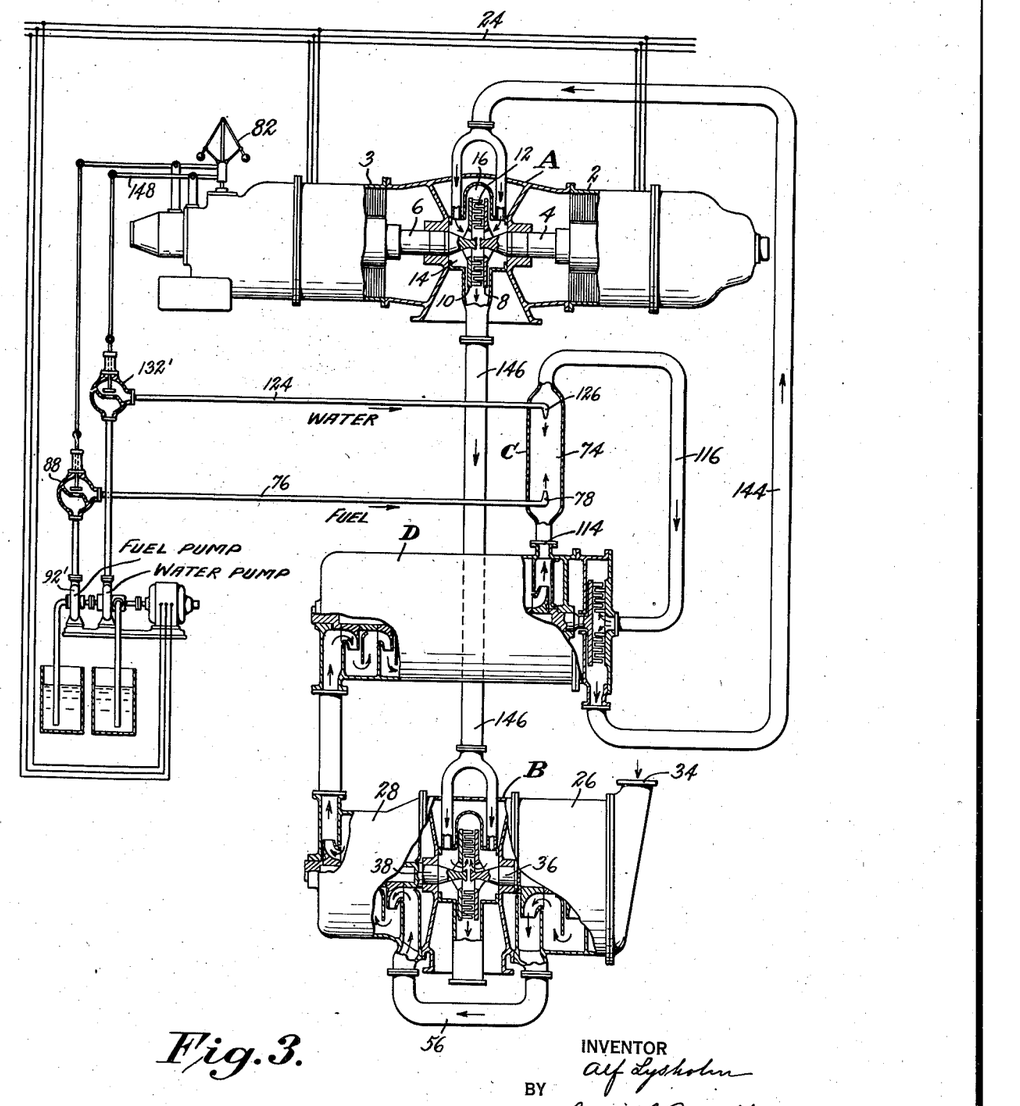
Fig. 3 is a view similar to Fig. 1 showing another gas turbine plant arrangement embodying the invention.

In the plant shown in Fig. 3 a three-section compressor system is employed, as in the arrangement shown in Fig. 2, but in the present arrangement the power output turbine and the turbine driving the low pressure compressor are connected in series rather than in parallel with respect to flow of motive fluid, and with the compressor turbine effecting the final expansion of the motive fluid.

Turning now more particularly to the drawings, the power output part of the plant comprises the turbo-generator A, the construction of which is similar to that previously described. The turbo-compressor B provides for low and intermediate compression of the air and high or final compression of the air is effected by means of a turbo-compressor D. In this embodiment it will be noted that the turbo-compressor B which is of the same general type as those previously described is smaller than the low pressure turbo-compressors in the embodiments in which the low pressure compressor turbine is connected in parallel with the generator turbine. Also, the high pressure turbo-compressor D is larger than the high pressure turbo-compressor in the parallel connected arrangement shown in Fig. 2. Except for the difference in relative sizes of the high and low pressure sections of the compressor part of the plant, these units are similar to those previously described and need not be described in further detail. The finally compressed air is delivered from the high pressure compressor through the connection 114 to the heating device C and the motive fluid produced in the heating device is conveyed through the conduit 116 to the turbine of the high pressure turbo-compressor D. Exhaust from the turbine of the turbo-compressor D is conducted by means of conduit 144 to the turbine of the turbo-generator A, this turbine exhausting through conduit 146 to the turbine of the low pressure turbo-compressor unit B. It will thus be seen that the several turbines in the present embodiment are connected in series with respect to flow of motive fluid, with the low pressure compressor turbine expanding the motive fluid through the last or lowest pressure stage and exhausting to atmosphere.

Reheating of the motive fluid between expansion stages is not indicated although it will be evident that such reheating may be employed, if desired.

Fuel is supplied to the combustion chamber of the heating device C in the manner already described, the fuel control valve 88 to which fuel is delivered from the centrifugal pump 92' being under the control of the governor 82.

Water injection to the combustion chamber 74 is indicated, water being supplied to pipe 124 through the water control valve 132' which in this instance is also governed by governor 82 through suitable linkage indicated at 148. In this particular arrangement of the control apparatus, the water and fuel supplies to the combustion chamber are regulated from the same governing mechanism and the quantities vary together, the water being injected primarily for the purpose of maintaining the temperature of the motive fluid leaving the combustion chamber within the desired temperature range. It will be noted that in this arrangement interstage cooling of the air in the compressor part of the apparatus is not employed and with the use of water injection it is not necessary to compress a large quantity of excess air in order to avoid excessive initial motive fluid temperatures. In the form of apparatus shown in Fig. 1, where water injection is not employed, the control of the fuel is advantageously arranged with respect to the quantity of air compressed so that combustion is effected with a substantial amount of excess air, whereby to maintain the initial motive fluid temperature at a suitable low value.

From the foregoing description of the different embodiments herein illustrated, it will be evident that very considerable variation is possible in the manner in which motive fluid is produced and maintained at the desired temperatures, such variations including water injection, combustion with substantial quantities of excess air, reheating, etc.

In the arrangement shown in Fig. 3, the same unthrottled flow of air during the process of compression and of motive fluid through the turbines is employed as in the earlier described embodiments, but the series flow of motive fluid through the several turbines results in somewhat different action of the plant in obtaining the desired automatic action in adjusting itself to variations in load.

In all of the embodiments illustrated, it will be noted that the turbine driving the low pressure compressor utilizes motive fluid in the last expansion stage and exhausts to atmosphere. The rate of operation of the low pressure compressor is determinative of the quantity of air compressed and of the quantity of motive fluid produced. Consequently where the plant is subjected to variations in load, it is highly desirable that the low pressure compressor be arranged so as to quickly change the quantity of air compressed when the load on the plant changes.

In a system of the kind herein disclosed, where the total power output of the turbine of the plant is regulated upon change in load by compensating regulation of the amount of fuel supplied, the desired sensitiveness of the action of the low pressure compressor in automatically regulating the quantity of air supplied is obtained when this compressor is driven by a turbine operated by the expansion of gases which are expanded in such turbine down to the lowest expansion stage of the system. This desirable regulation is furthermore secured without the necessity for throttling regulation of any of the gaseous fluid supplies and the reason why this desirable regulation is obtainable with the arrangements disclosed may be briefly and generally summarized as follows.

With an initial temperature of motive fluid of approximately constant value, the heat energy which can be usefully extracted from such motive fluid in a turbine is a function of the available pressure drop through the turbine. In systems of the kind herein disclosed, the result of decreasing the quantity of fuel supplied in response to a decrease in load on the plant is to first cause a momentary drop in the initial temperature of the motive fluid, resulting in a decreased energy content of a given quantity of such fluid and a consequent slowing down of the compressor turbine or turbines. This in turn results in compressing a lesser quantity of air. This in turn tends to bring the initial temperature of the motive fluid back to approximately its normal temperature when operated at full load, but with the motive fluid being produced and supplied to the turbines of the system at a pressure lower than the pressure for normal full load operation.

Since the change in the quantity of fuel supplied occurs first upon change in load on the plant, it is obviously desirable to make the effect of this change felt as rapidly as possible by the compressor determining the quantity of air to be compressed, so that as quickly as possible after change in the amount of fuel supplied, there shall be a corresponding change in the amount of air compressed, thus bringing the plant to a stabilized condition for the new load in the shortest possible time. By so arranging the turbines of the plant that the low pressure compressor turbine exhausts to constant back pressure, this is readily accomplished. Upon the initial drop in temperature of motive fluid supplied to the low pressure compressor turbine, the energy which this turbine can extract from the motive fluid is sharply decreased in a manner which would not be true if the turbine were exhausting to another turbine for further expansion of the fluid in such other turbine. Consequently, there is a quick response, which is reflected in a slowing down of the speed of operation of the low pressure compressor with the resulting and substantially immediate decrease in the quantity and pressure of the compressed air. This in turn means decreased quantity and pressure of motive fluid. At the stabilized value of part load, with the motive fluid restored to substantially normal initial temperature but at lower pressure the low pressure compressor turbine continues to be able to operate the compressor only at part capacity because of the fact that while the initial temperature may be restored to substantially normal, it is impossible for the turbine, which is exhausting against a constant back pressure, to expand the motive fluid to as low a final temperature as would be the case if the expansion range were equal to the expansion range corresponding to full load operation.

This is true regardless of whether the low pressure compressor turbine is in parallel with a second turbine as shown in the embodiments of Figs. 1 and 2 or is connected in series as shown in Fig. 3.

In the series connected arrangement, the low pressure compressor turbine is even more sensitive as a governing means for controlling the quantity of air compressed than in the arrangements where it is connected in parallel with another turbine operating in the same expansion range. The series arrangement may in general be said to be most suitable for plants designed to operate at normal full load with high initial pressures whereas the parallel arrangement may be most advantageously used where initial pressures are not so great.

The reason why the low pressure compressor driven by a low pressure turbine exhausting to atmosphere or other zone of constant pressure is more sensitive when connected in series is due to the fact that upon decrease in load and decrease in initial pressure the range of expansion through which the motive fluid can be expanded in this turbine is proportionately less at part load than at full load. For example, let it be assumed that the arrangement of Fig. 3 is designed so that at normal full load, the inlet pressure of the high pressure turbine of the turbo-compressor D is 8 atmospheres (absolute) and that the motive fluid is expanded in this turbine at full load to an intermediate pressure of 4 atmospheres at which pressure it is delivered to the turbine of the generator unit A. Let it further be assumed that the intermediate pressure turbine expands the motive fluid at full load to a pressure of 2 atmospheres at which pressure it is admitted to the turbine of the low pressure compressor B, exhausting from the latter turbine at atmospheric pressure. If now the load on the plant decreases to a value such that a stable operation is obtained with an initial pressure for the motive fluid of 4 atmospheres instead of 8 atmospheres, it will be found, assuming substantially constant initial temperature of the motive fluid, that the total heat drop of the motive fluid in expanding through the whole plant will be about three quarters of the corresponding heat drop at full load. The heat drop in the lowest pressure turbine however will be only about one third of the heat drop in this turbine at full load and the heat drop in the remaining turbines will be proportionately about the same irrespective of variations in the load on the plant. The reason for this is that as the initial pressure drops the back pressure against which all turbines except the lowest pressure turbine exhaust, also drops. Thus at part load I have, in a system such as shown in Fig. 3, both the high pressure and the intermediate pressure turbine receiving motive fluid at lower pressure than full load pressure and exhausting motive fluid at lower pressure than at full load, while on the other hand the low pressure turbine receives motive fluid at part load at a pressure lower than full load pressure but has to exhaust against the same back pressure as at full load. Consequently this turbine, in an arrangement such as this, has a proportionately smaller expansion range and a proportionately smaller heat drop of motive fluid at part load on the plant than at full load.

Due to the fact that with change in load the low pressure turbine is affected to a greater extent with respect to the power it is capable of developing than turbines of higher pressure exhausting to a variable back pressure, such a turbine driving the low pressure compressor, acts as a very sensitive governing means for quickly and automatically adjusting the quantity of air compressed when the quantity of fuel supplied is adjusted to take care of variations in load on the plant. Moreover this sensitive and automatic adjustment is accomplished without having to resort to throttling of any of the gaseous fluid conduits in order to obtain a proper relation between fuel supply and air quantity at reduced loads. By avoiding throttling the loss in efficiency which inevitably accompanies throttling control, is avoided.

When the compressor employed is of the centrifugal type, the relation of the speed of operation of the compressor part to the quantity of air to be delivered by the compressor must for normal designs be maintained within certain defined limits, as will be understood by those skilled in the art. Calculations, which it is not believed necessary to set forth in detail herein, demonstrate that with the compressor to which low pressure air is admitted is driven by a low pressure turbine, the automatic response to variations in load which are compensated for by varying the fuel supply result in operation of the low pressure turbine at speeds which in relation to the quantity of air compressed, maintain stable compressor operation at efficiency which is high in relation to the full load efficiency.

For plants designed to operate at relatively high initial pressure for the motive fluid, the turbine driving the low pressure compressor part may either expand all of the motive fluid through the lowest pressure range or may be connected in parallel with a generator turbine which also expands at the lowest pressure. For low pressure plants, the latter arrangement is preferable, particularly when the plant is likely to be subjected to loads of widely varying value. When the turbine driving the low pressure compressor part expands all of the motive fluid through the lowest pressure range, the most advantageous operation is obtained by proportioning the several compressor parts so that the low pressure compressor part is operated by a turbine designed for a heat drop of the motive fluid passing therethrough at normal full load which is a relative small part of the total heat drop at such load. When this turbine is connected in parallel with a generator turbine with respect to flow of motive fluid, it is advantageously designed for a somewhat higher heat drop without incurring disadvantages when the plant is operated at widely varying loads.

From the foregoing it will be evident that the invention is applicable to many different plant arrangements, and while for purposes of illustration relatively simple plant arrangements have been shown, it is particularly to be understood that the invention is also applicable to plants incorporating a larger number of turbines.

As will be appreciated by those skilled in the art, the problem of providing an operative gas turbine system of the continuous combustion type, which will produce sufficient net useful power over and above that required to operate the compressor turbine or turbines, and which will produce such power with reasonable efficiency, is exceedingly difficult of solution.

I have found that in order to provide a system which is operative to produce any reasonable percentage of net useful power, it is necessary that the motive fluid be utilized in high efficiency turbines having efficiency such that the overall turbine efficiency of the plant is of the order of 80% and preferably higher. High turbine efficiency of the kind I have found to be essential in a system of this character requires the use of multiple stage expansion in reaction blading and this in turn means that a substantial portion of the turbine blading must operate at or near the initial temperature of the motive fluid. To produce motive fluid at high initial temperature and to then expand it through nozzles to convert part of the heat energy of the motive fluid into velocity energy and thereby reduce its temperature before it reaches the turbine blading is not feasible because it is impossible by this method of utilization of the motive fluid to secure sufficiently high turbine efficiencies.

Consequently, for an operative system, it is necessary to maintain the initial temperature of the motive fluid within a controlled range. If the initial temperature is allowed to drop to too low a value then the usable potential heat drop is insufficient to produce the required power. On the other hand if the initial temperature is of too high a value, the motive fluid can not be admitted directly, with full admission, to high efficiency turbine blading, because of the fact that any blading constructed of known commercial materials can not withstand the combined mechanical and temperature stresses resulting from operation of the moving blading at the initial temperature of the motive fluid. I have found that an operative system can and does produce substantial percentages of net useful power when the system comprises high efficiency turbine blading with full admission of motive fluid to the blading and the initial temperature of the motive fluid is maintained within a range of which the lower limit is of the order of 800° C. absolute and the upper limit of which is of the order of 1,000° C. absolute.

For moderate fluctuations in load on a system of the kind under discussion, fuel control alone, when the turbines are arranged in accordance with the present invention, may be sufficient to keep the temperature variations within the desired range. For plants however, that may be subjected to loads of widely varying value, it is advantageous to insure against wide temperature fluctuations through the medium of controlled water injection. This may be particularly desirable for use in taking care of heavy overloads. For example, in the embodiment of apparatus shown in Fig. 2, water injection may be employed under the control of a thermostat responsive to the temperature of motive fluid as produced in the combustion chamber or chambers of the system so as to limit the variations in temperature of the motive fluid that arise upon change in the rate of fuel supply upon change in load on the system.

As hereinbefore pointed out, an important object of the invention, namely, the operation of a system of the kind described, with good efficiency under variable load conditions, is attained in an organization in which open conduits permitting free, unthrottled flow of the air for the motive fluid and of the motive fluid itself are characteristic, and in the several embodiments illustrated, conduits for these fluids have been shown without valves or other throttling means.

It will be understood, however, that the system has been illustrated, its characteristics of operation and regulation have been discussed, and that the system is claimed on the basis of normal operation within the ranges of load variation which the system is designed to meet in normal service. As will readily be appreciated, abnormal over-load or abnormal reduction in load may create emergency conditions which impose mechanical or temperature stresses of dangerous proportions on the parts of the apparatus comprising the system. In such event the operating efficiency of the system becomes of no material importance until the emergency conditions have passed, and it will be obvious that for the protection of the system under such conditions, emergency control devices of any desired character may be installed without departing from the spirit or scope of the invention, even though such apparatus may include devices which may interrupt or alter the free unthrottled flow of fluids characteristic of the normal operation of the system.

Load control of water injection may also be advantageously employed as shown in the system illustrated in Fig. 3. This is particularly useful in the case of overloads since water injection upon overload enables the quantity of available motive fluid to be increased without increasing the amount of compressor work.

With this arrangement of the system, the heat of the additional fuel supplied to take care of the overload condition, instead of operating to greatly increase the temperature of the motive fluid, serves to vaporize the injected water and to increase the quantity of motive fluid available for overload operation. With the increased quantity of motive fluid available, and with the compressor work not increased proportionately to the increase in the quantity of motive fluid, there is then sufficient energy available to enable the overload to be taken care of, with the turbines still operating with motive fluid which is within the permissive range of temperatures.

While insofar as the broader aspects of the invention are concerned, water injection may or may not be employed, the use of water injection to maintain a control of motive fluid temperatures within the desired range for which the system is designed constitutes an important factor for systems subjected to high degrees of load variation.

It will be understood that in the foregoing description and in the appended claims the term "low pressure" as applied to a compressor is used with reference to the inlet or admission side of the compressor. Within the scope of the meaning of this term, as herein employed, the compressor may discharge the compressed fluid at relatively low or relatively high pressure depending upon the number of stages in the compressor and depending upon whether total compression for the system is effected in one compressor or in a number of serially connected compressors.

The hereinbefore described gas turbine system falls within the scope of the broad subject matter claimed in my copending application 715,267, filed March 13, 1934, and certain features relating to the arrangement involving reheating of the motive fluid described and illustrated in connection with Fig. 2 hereof but not herein claimed are included in the subject matter of my copending application Serial No. 681,697 filed July 22, 1933.

I claim:

1. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow of motive fluid so that exhaust motive fluid from the turbine driving the low pressure compressor is discharged to substantially constant back pressure, and governing means for varying the rate at which fuel is supplied in accordance with variations in the external load on the system.

2. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to said turbines of the motive fluid produced, said conduit means including conduits connected for flow of motive fluid in parallel to said power output turbine and the low pressure compressor turbine, said low pressure compressor turbine exhausting to substantially constant back pressure, and governing means for varying the rate at which fuel is supplied in accordance with variations in the external load on the system.

3. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow to the low pressure compressor turbine of motive fluid exhausted from another turbine of the system, said low pressure compressor turbine exhausting to substantially constant back pressure, and governing means for varying the rate at which fuel is supplied in accordance with variations in the external load on the system.

4. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow of motive fluid so that the turbine driving the low pressure compressor operates as a low pressure turbine exhausting to substantially atmospheric pressure, and governing means varying the rate at which fuel is supplied in accordance with variations in the external load on the system.

5. In a gas turbine system of the continuous combustion type, a plurality of turbines independent of each other with respect to speed of operation, a low pressure compressor, a high pressure compressor and power producing means each separately driven by a different one of said turbines, a combustion chamber, means for supplying fuel to said combustion chamber to produce high temperature motive fluid, open conduit means for continuous unthrottled flow to said combustion chamber of the gaseous medium compressed by said compressors and to said turbines of the motive fluid produced, said conduit means including conduits connecting said compressors in series and conduits connected for flow of motive fluid to said turbines so that the turbine driving the low pressure compressor operates as a low pressure turbine exhausting to substantially atmospheric pressure, and governing means varying the rate at which fuel is supplied in accordance with variations in the external load on the system.

6. In a gas turbine system of the continuous combustion type, a plurality of turbines independent of each other with respect to speed of operation, a low pressure compressor, a high pressure compressor and power producing means each separately driven by a different one of said turbines, a combustion chamber, means for supplying fuel to said combustion chamber to produce high temperature motive fluid, open conduit means for continuous unthrottled flow to said combustion chamber of the gaseous medium compressed by said compressors and to said turbines of the motive fluid produced, said conduit means including conduits connecting said compressors in series and conduits connected for flow of motive fluid serially, in the order named, through the turbine operating the high pressure compressor and the turbine operating the low pressure compressor, the last mentioned turbine operating as a low pressure turbine exhausting to substantially atmospheric pressure, and governing means varying the rate at which fuel is supplied in accordance with variations in the external load on the system.

7. In a gas turbine system of the continuous combustion type, a plurality of turbines independent of each other with respect to speed of operation, a low pressure compressor, a high pressure compressor and power producing means each separately driven by a different one of said turbines, a combustion chamber, means for supplying fuel to said combustion chamber to produce high temperature motive fluid, open conduit means for continuous unthrottled flow to said combustion chamber of the gaseous medium compressed by said compressors and to said turbines of the motive fluid produced, said conduit means including conduits connecting said compressors in series and conduits connected for flow of motive fluid first through the turbine driving the high pressure compressor and then in parallel through the turbine driving the low pressure compressor and the turbine driving said power producing means, the turbine driving the low pressure compressor operating as a low pressure turbine exhausting to substantially atmospheric pressure, and governing means varying the rate at which fuel is supplied in accordance with variations in the external load on the system.

8. In a gas turbine system of the continuous combustion type, a plurality of turbines independent of each other with respect to speed of operation, a low pressure compressor, a high pressure compressor and power producing means each separately driven by a different one of said turbines, a combustion chamber, means for supplying fuel to said combustion chamber to produce high temperature motive fluid, open conduit means for continuous unthrottled flow to said combustion chamber of the gaseous medium compressed by said compressors and to said turbines of the motive fluid produced, said conduit means including conduits connecting said compressors in series and conduits connected for flow of motive fluid in series, in the order named, through the turbine driving the high pressure compressor, the turbine driving the power producing means and the turbine driving the low pressure compressor operating as low pressure turbines exhausting to substantially atmospheric pressure, and governing means varying the rate at which fuel is supplied in accordance with variations in the external load on the system.

9. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow of motive fluid so that exhaust motive fluid from the turbine driving the low pressure compressor is discharged to substantially constant back pressure, governing means for varying the rate at which fuel is supplied in accordance with variations in the load on the system, and means for injecting a controlled quantity of water to the motive fluid produced in said combustion chamber to maintain the initial temperature of the motive fluid produced within a predetermined range of temperatures regardless of variations in the value of the external load on the system.

10. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow of motive fluid so that exhaust motive fluid from the turbine driving the low pressure compressor is discharged to substantially constant back pressure, governing means for varying the rate at which fuel is supplied in accordance with variations in the load on the system, means for injecting water into the motive fluid formed in said combustion chamber, and means for increasing the amount of water injected upon increase in the value of the external load on the system.

11. In a gas turbine system of the continuous combustion type, a plurality of turbines independent of each other with respect to speed of operation and including a power output turbine and a turbine driving a low pressure compressor, a combustion chamber, means for supplying fuel to said combustion chamber to produce high temperature motive fluid, open conduit means for continuous unthrottled flow to said combustion chamber of the gaseous medium compressed in said compressor and to the turbines of the motive fluid produced, said conduit means including conduits connected for flow of motive fluid so that exhaust motive fluid from the turbine driving the low pressure compressor is discharged to substantially constant back pressure, governing means for varying the rate at which fuel is supplied in accordance with variations in the load on the system, means for injecting water into the motive fluid, and means operating in response to the temperature of the motive fluid leaving the combustion chamber for controlling the rate at which water is injected, whereby to maintain the initial temperature of the motive fluid within a predetermined range of temperatures regardless of variations in the value of the external load on the system.

12. In a gas turbine system of the continuous combustion type, a plurality of turbines independent of each other with respect to speed of operation and including a power output turbine and a turbine driving a low pressure compressor, all of said turbines having blade systems adapted to operate at high efficiency and having admission chambers for central full admission of motive fluid to said blade systems, a combustion chamber, means for supplying fuel to said combustion chamber to produce high temperature motive fluid, open conduit means for continuous unthrottled flow to said combustion chamber of the gaseous medium compressed in said compressor and to said admission chambers of the motive fluid produced, said conduit means including conduits connected for flow of motive fluid so that the turbine driving the low pressure compressor operates as a low pressure turbine discharging to substantially atmospheric pressure, and governing means for varying the rate at which fuel is supplied in accordance with variations in the external load on the system.

13. In a gas turbine system of the continuous combustion type, a plurality of turbines independent of each other with respect to speed of operation and including a power output turbine and a turbine driving a low pressure compressor, all of said turbines having blade systems adapted to operate at high efficiency and having admission chambers for central full admission of motive fluid to said blade systems, a combustion chamber, means for supplying fuel to said combustion chamber to produce high temperature motive fluid, open conduit means for continuous unthrottled flow to said combustion chamber of the gaseous medium compressed in said compressor and to said admission chambers of the motive fluid produced, said conduit means including conduits connected for flow of motive fluid so that the turbine driving the low pressure compressor operates as a low pressure turbine discharging to substantially atmospheric pressure, governing means for varying the rate at which fuel is supplied in accordance with variations in the load on the system, and means for injecting water into the motive fluid at controlled rates so as to maintain the initial temperature of the motive fluid within a predetermined temperature range regardless of variations in the value of the external load on the system.

14. A gas turbine system of the continuous combustion type including a power output turbine and a compressor turbine independent of said power output turbine with respect to speed of operation, both of said turbines being arranged to exhaust to substantially constant back pressures of like value, a low pressure compressor driven by said compressor turbine, combustion chamber means, fuel supplying means for supplying fuel to said combustion chamber means, open conduit means including conduits arranged for continuous unthrottled flow of compressed gaseous fluid from said compressor to said combustion chamber means and for flow of motive fluid from said combustion chamber means to the inlets of said turbines and governing means for varying the rate at which fuel is supplied in accordance with variations in the external load on the system, said fuel supplying and governing means and the conduit means connecting said combustion chamber means with the inlets of said turbines being arranged so that motive fluid is supplied to both of said turbines at substantially like initial temperatures and pressures.

15. A gas turbine system of the continuous combustion type including a power output turbine and a compressor turbine independent of said power output turbine with respect to speed of operation, both of said turbines being arranged to exhaust to substantially atmospheric back pressure, a low pressure compressor driven by said compressor turbine, combustion chamber means, fuel supply means for supplying fuel to said combustion chamber means, open conduit means including conduits arranged for continuous unthrottled flow of compressed gaseous fluid from said compressor to said combustion chamber means and for flow of motive fluid in parallel from said combustion chamber means to the inlets of said turbines and governing means for varying the rate at which fuel is supplied in accordance with variations in the external load on the system, said fuel supplying and governing means being arranged to supply fuel to said combustion chamber means so that the motive fluid supplied to both of said turbines is supplied thereto at substantially like initial temperatures.

ALF LYSHOLM.